United States Patent [19]

Ishibashi

[11] 4,188,662
[45] Feb. 12, 1980

[54] ADDRESS CONVERTER IN A DATA PROCESSING APPARATUS

[75] Inventor: Masamichi Ishibashi, Tokyo, Japan

[73] Assignee: Fujitsu Limited, Japan

[21] Appl. No.: 787,493

[22] Filed: Apr. 14, 1977

[30] Foreign Application Priority Data

Apr. 27, 1976 [JP] Japan .................. 51-48259

[51] Int. Cl.² .............................................. G06F 9/20
[52] U.S. Cl. ............................................... 364/200
[58] Field of Search ... 364/200 MS File, 900 MS File

[56] References Cited

U.S. PATENT DOCUMENTS

| | | | |
|---|---|---|---|
| 3,693,165 | 9/1972 | Reiley et al. | 364/200 |
| 3,723,976 | 3/1973 | Alvarez et al. | 364/200 |
| 3,725,864 | 4/1973 | Clark et al. | 364/200 |
| 3,761,881 | 9/1973 | Anderson et al. | 364/200 |
| 3,781,808 | 12/1973 | Ahearn et al. | 364/200 |
| 3,786,427 | 1/1974 | Schmidt et al. | 364/200 |
| 3,839,706 | 10/1974 | Borchsenius | 364/200 |
| 3,902,163 | 8/1975 | Amdahl et al. | 364/200 |

*Primary Examiner*—Mark E. Nusbaum
*Attorney, Agent, or Firm*—Staas & Halsey

[57] ABSTRACT

An address converter according to the present invention is provided with an adddress conversion table, and can store a single logical address, a single physical address, a plurality of logical addresses or a plurality of physical addresses in the same address position, wherein the stored logical address and the stored physical address can be reversibly converted. The address conversion is carried out in such a manner that when the given address is a logical address, the logical address corresponds to one physical address or a plurality of physical addresses read from the address conversion table; and, when the given address is a physical address, the physical address corresponds to one logical address or a plurality of logical addresses read from the address conversion table.

8 Claims, 3 Drawing Figures

ADDRESS CONVERTER IN A DATA PROCESSING APPARATUS

The present invention relates to an address conversion mechanism which can convert logical address information to physical address information and physical address information to logical address information, and which can effectively utilize the hardware of the data processing apparatus. In the following explanation of the invention, the channel addresses which are used in a software system are called logical addresses. In addition, the channel addresses which are used in a hardware system will be called physical addresses. Recently, various small and large size computer systems have been employed in the computer industry. The varying sizes of computer systems generally require an operating system which can flexibly applied to both large and small size computer systems. In all conventional computer systems provided with channels, such channels are specifically provided with channel addresses associated therewith. However, since the number of channels differs between small and large systems and since the conventional operating system is designed to be applied to the largest size system, the channel addresses of such an operating system, in most cases, cannot be suitably applied to small computer systems since the number of channels thereof is much fewer than that of large systems. In the case wherein channel addresses specifically provided for the channels cannot be applied to an operating system, these channel addresses must be changed or converted so that they can be applied to the operating system. In the prior art, when it was necessary to convert the logical address to the physical address, or vice versa, the logical address-physical address conversion table which changed a logical address to a physical address and a physical address-logical address conversion table which changed a physical address to a logical address could be used. When the above-mentioned tables are being stored in a memory device in the data processing apparatus, if a word length as an access unit in the memory device is longer than a bit length of the physical address or longer than a bit length of the logical address in the tables, a bit region located in the memory device cannot be effectively used. For example, if the word length in the memory device is 32 bits per word and the bit lengths of the logical address and of the physical address are 8 bits, per word, respectively, then 24 bits per word will not be used in the memory device.

An object of the present invention is to effectively utilize the hardware of the memory device when the above-mentioned address conversion is being carried out.

The above-mentioned object can be achieved by using a data processing apparatus which is provided with an address converter for converting a logical address information to a physical address information and, conversely, for converting the physical address information back to the logical address information. Such address converter comprises an address conversion table, an address gate means and an output gate means, wherein the address conversion table stores a single logical address, a single physical address, a plurality of logical addresses or a plurality of physical addresses in the same address position, and the logical address information and the physical address information can be read out at the same time. The address gate means selects either a logical address information or a physical address information as an access information to said address conversion table; and the output gate means selects (1) one of the logical address information and the physical address information read from the address conversion table, (2) the physical address information which is read from the address conversion table when the address gate means selects the logical address information as the access information, and (3) the logical address information which is read from the address conversion table when the address gate means selects the physical address information as the access information.

Further features and advantages of the present invention will be apparent from the ensuring following description with reference to the accompanying drawings, to which, however, the scope of the invention is in no way limited.

Channel devices are provided in the data processing system for determining similar physical conditions for the various kinds of peripheral devices with regard to the central processing unit.

Figure 1:
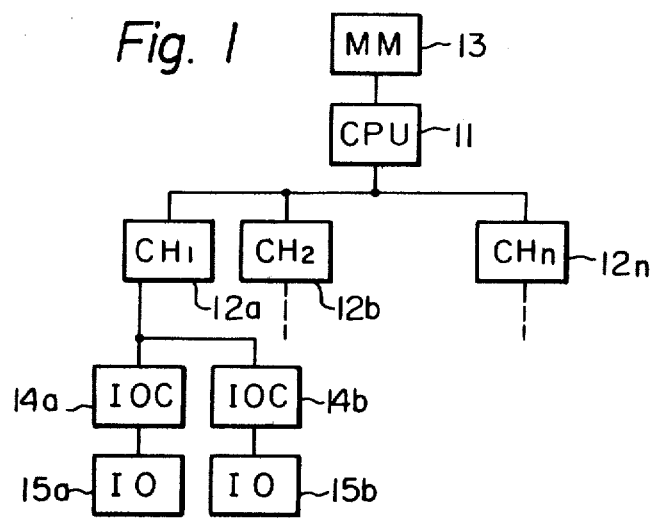
FIG. 1 is a block diagram of a data processing apparatus which has a plurality of channels therein.

FIG. 1 shows a block diagram of a data processing apparatus which has channel devices therein.

Referring to FIG. 1, a central processing unit 11 has several channel devices 12a, 12b..., 12n. Each of the channel devices 12a, 12b, ..., 12n has input-output control units, for example, 14a and 14b, and input-output units, for example, 15a and 15b. A main memory device 13 is provided with respect to the central processing unit 11.

In the prior art, a plurality of channel devices are usually provided, and each channel device has a specific address which is a channel address for selecting the channel to be used by the center processing unit when the center processing unit utilizes these channel devices. An input-output control operation is carried out between the center processing unit and the channel devices by using the channel address.

In the above-mentioned input-output control operation, a channel address conversion table is employed for creating a correspondence between the logical address written on a program and the physical address actuating the channel devices.

Figure 2:
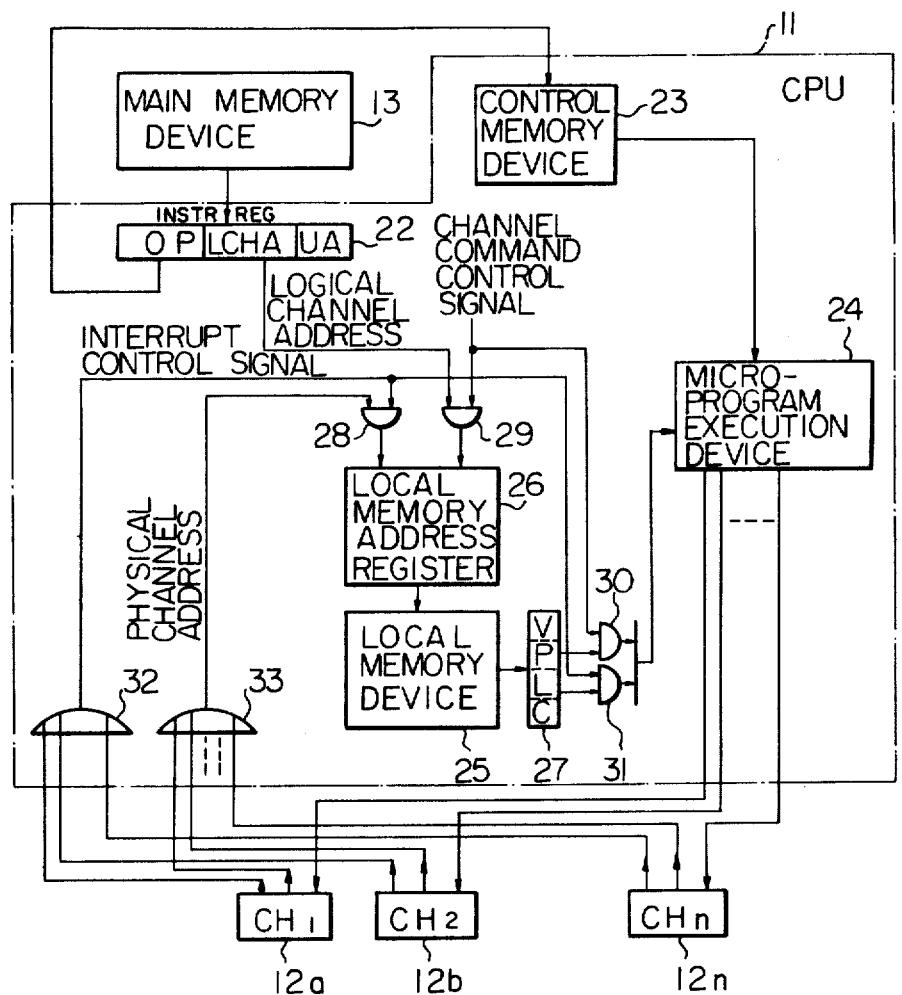
FIG. 2 is one embodiment of the address converter according to the present invention.

FIG. 2 shows one example of the channel address converter system according to the present invention. Referring to FIG. 2, a reference numeral 11 indicates the center processing unit, 12a, 12b, . . . , 12n channel devices, 13 a main memory device, 22 an instruction register, 23 a control memory device, 24 a microprogram execution device, 25 a local memory device, 26 a local memory address register, 27 a local memory data register, 28 through 31 AND gates, and 32 and 33 OR gates, respectively.

Figure 3:
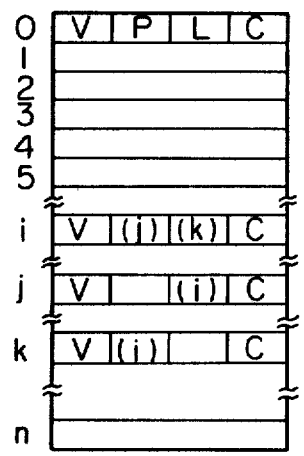
FIG. 3 is one example of the channel address conversion table which is used in the address converter shown in FIG. 2.

FIG. 3 is a channel address conversion table which is stored in the local memory device 25 in the embodiment shown in FIG. 2. Referring to the channel address conversion table shown in FIG. 3, a part V shows whether or not the channel device is installed in the system, and the kind of channel device which is installed therein. For example: (1) when the part V has a value "0", the part V indicates that the channel corresponding to the channel address is not provided; (2) when the part V has a value "1", the part V indicates that the channel corresponding to the channel address is a selector channel (SLC) (not shown in FIG. 3); and (3) when the part V has a value "2", the part V indicates that the channel corresponding to the channel address is a block multiplexer channel (BMC) (not shown in FIG. 3).

A part P in FIG. 3 indicates the correspondence between the logical channel and the physical channel when the logical channel address is converted into the physical address. That is, if the logical channel address "i" is given as the address, the physical address corresponding to the logical channel address "i" will then be "j".

A part L in FIG. 3 shows the correspondence between the physical channel address and the logical channel address when the physical channel is converted to the logical channel. That is, if the physical channel address "i" is given as the address, the logical address corresponding to the physical channel address "i" will then be "k".

Both the physical channel address and the logical channel address in the channel address conversion table can be accessed from the local memory address register 26. When the accessing operation is carried out with the logical address, the content of the part P is used, and when the accessing operation is carried out with the physical address, the content of the part L is utilized.

A part C in FIG. 3 is a data field for extending the length of the content of the channel address. For example, if the part L is added to the part C, a plurality of the physical channels can be made to correspond to one logical channel.

Next, the block diagram as shown in FIG. 2 will be explained. An instruction is fetched from the main memory device 13. An instruction part (OP) as well as a logical channel address (LCHA) and a unit address (UA) appear in to the instruction register 22. The content of the instruction part (OP) accesses the control memory device 23 and a control instruction therefrom is executed in the microprogram execution device 24. At the same time, the logical channel address (LCHA) in the instruction register 22 is applied to the local memory address register 26 via the AND gate circuit 29 enabled by a channel command control signal, as shown. The content of the local memory address register 26 accesses the address conversion table stored in the local memory device 25, and the corresponding word is read out to the local memory data register 27.

The parts V, P, L and C shown in FIG. 3 appear in the local memory data register 27. Next, with respect to the content of the local memory data register 27, whether or not part V has the value "0" is examined. When the value is "0", that is, when the channel device is not installed, the present instruction is terminated and the next instruction is processed. If the physical channel address in the data resister 27 is provided, the channel is actuated by the physical channel address P which is sent via the AND gate 30 (enabled by a channel command control signal) to the microprogram execution device 24.

An interrupting operation from the channel device will now be explained.

The physical channel address from the channel device is set via the OR gate 33 and the AND gate 28 in the local memory address register 26. The content of the local memory address register 26 accesses the address conversion table stored to the local memory device 25, and the corresponding word is read out in the local memory data register 27. In addition, the parts V, P, L and C shown in FIG. 3 are applied to the local memory data register 27 in a manner similar to that when the instruction is executed. When the interrupting operation is carried out from the channel device 12a, 12b, ... to the central processing unit 11, the AND gate 31 is opened by the interrupt control signal from OR gate 32, the logical channel address (L) is sent to the microprogram execution device 12a, 12b, ... 24, and the channel device is then caused to interrupt the operation of the central processing device.

As mentioned above, according to the address converter of the present invention, both the logical address and the physical address can be stored in the same address of the address conversion table. Furthermore, the address conversion table can be used for converting from the logical address to the physical address and, conversely, from the physical address to the logical address. Therefore, the number of words required in the address conversion table, according to the present invention, can be considerably decreased if compared to a system which uses two conversion tables, that is, one table for conversion from the logical address to the physical address and another table for conversion from the physical address to the logical address. In addition, the memory device which, in the present invention, stores the address conversion table can be effectively utilized.

In the above-mentioned explanation, although only one embodiment of the channel address converter according to the present invention is described, it is understood that the present invention encompasses those equivalent embodiments of the above-described channel address converter which would occur to one of skill in the art.

What is claimed is:

1. In a data processing apparatus which includes first means for generating first control signals indicating needed conversion, to physical address information, of a logical address to be translated, and second means for generating second control signals indicating needed conversion, to logical address information, of a physical address to be translated; a channel and input/output device address converter, comprising:

memory means for storing at least an address conversion table having address positions, each address position indicating a respective logical address to be translated and a respective physical address to be translated, said memory means storing, at said each address position, at least one physical address information corresponding to said respective logical address to be translated indicated by said each address position and at least one logical address information corresponding to said respective physical address to be translated indicated by said each address position, address gate means responsive to said first control signal and said second control signal, respectively, for enabling access of said address conversion table by said logical address to be translated and said physical address to be translated, respectively, at said address position indicating said logical address to be translated and said physical address to be translated, respectively, so as to cause simultaneous readout, from said address position indicating said logical address to be translated and said physical address to be translated, respectively, of both said physical address information and said logical address information stored at said address position indicating said logical address to be translated and said physical address to be translated, respectively, said physical address information and said logical address information stored at said address position indicating said logical address to be translated and said physical address to be translated, respectively, thereby not corresponding to each other, but rather said physical address information stored at said address position being a translation of said logical address to be translated, and said logical address information stored at said address position being a translation of said physical address to be translated, and output gate means responsive to said first and second control signals for selecting, in accordance with said indicated needed conversion, one of said physical address information and said logical address information as simultaneously read out from said memory means.

2. In a data processing apparatus according to claim 1 wherein said each given address position stores a plurality of physical address information and a plurality of logical address information.

3. In a data processing apparatus according to claim 1 wherein said first control signal is a channel command control signal generated by said data processing apparatus.

4. In a data processing apparatus according to claim 1 wherein said second control signal is an interrupt control signal received by said data processing apparatus.

5. In a data processing system comprising:

a main memory for storing, and addressable for providing, program instructions, each instruction including a logical address to be converted, a central processor for executing said program instructions, and at least one channel unit for input/output of data to/from said central processor and providing a physical address to be converted, said central processor including first means for generating channel command control signals indicating needed conversion of said logical address to be converted to physical address information, and second means for generating interrupt control signals indicating needed conversion of said physical address to be converted to logical address information;

a channel and input/output device address converter, comprising:

memory means having address positions, each address position indicating a respective logical address to be converted and a respective physical address to be converted, said memory means storing, in said each address position, at least physical address information corresponding to said respective logical address to be converted indicated by said each address position and logical address information corresponding to said respective physical address to be converted indicated by said each address position, first means responsive to said channel command control signal and to said interrupt control signal, respectively, for selectively accessing said memory means with said logical address and said physical address, respectively, at said address position indicating said logical address to be converted and said physical address to be converted, respectively, so as to simultaneously read out, from said address position indicating said logical address to be converted and said physical address to be converted, respectively, of both said logical address information corresponding to said respective physical address to be converted indicated by said each address position and said physical address information corresponding to said respective logical address to be converted indicated by said each address position, said physical address information and said logical address information stored at said address position indicating said logical address to be converted and said physical address to be converted, respectively, thereby not corresponding to each other, but rather said physical address information stored at said address position being a conversion of said logical address to be converted, and said logical address information stored at said address position being a conversion of said physical address to be converted, and second means responsive to said channel command control signal and said interrupt control signal, respectively, for selecting said physical address information and said logical information, respectively, as simultaneously read out from said memory means.

6. In a data processing system according to claim 5 wherein each address position in said memory means stores a plurality of logical address information and a plurality of corresponding physical address information.

7. In a data processing system according to claim 5 wherein said first means comprises a plurality of logical gates.

8. In a data processing system according to claim 5 wherein said second means comprises a plurality of logical gates.

* * * * *

UNITED STATES PATENT AND TRADEMARK OFFICE
CERTIFICATE OF CORRECTION

PATENT NO. : 4,188,662
DATED : February 12, 1980
INVENTOR(S) : Masamichi Ishibashi It is certified that error appears in the above-identified patent and that said Letters Patent are hereby corrected as shown below:

Column 1, line 18, after "can" insert -- be --;

Column 2, line 15, delete "ensuring";

*Column 3, line 58, "resister" should be -- register --.

Signed and Sealed this

Tenth Day of June 1980

[SEAL]

Attest:

SIDNEY A. DIAMOND

Attesting Officer

Commissioner of Patents and Trademarks